United States Patent [19]
Halfon et al.

[11] 3,856,127
[45] Dec. 24, 1974

[54] PHOTO-OPTICAL KEYBOARD

[76] Inventors: Uri Halfon, 3200 South Sepulveda, Los Angeles, Calif. 90034; Meir Niv, 611 N. Curson Ave., Los Angeles, Calif. 90036

[22] Filed: Nov. 24, 1972

[21] Appl. No.: 309,186

[52] U.S. Cl. .......... 197/98, 178/17 D, 250/221, 340/365 P, 350/96 R
[51] Int. Cl. .......... B41j 5/08
[58] Field of Search ....... 197/98; 235/145; 250/227, 250/209, 215, 221; 340/380, 365; 350/96; 178/17

[56] References Cited
UNITED STATES PATENTS

| | | | |
|---|---|---|---|
| 3,253,087 | 5/1966 | McIntosh | 178/17 D X |
| 3,465,099 | 9/1969 | Harris | 197/98 X |
| 3,519,116 | 7/1970 | Koehn | 197/98 |
| 3,579,047 | 5/1971 | Strum et al. | 250/221 |
| 3,581,003 | 5/1971 | Leone et al. | 197/98 X |
| 3,603,982 | 9/1971 | Patti | 340/365 P |
| 3,609,759 | 9/1971 | Teske | 197/98 X |
| 3,617,627 | 11/1971 | McLean | 340/365 P |
| 3,648,050 | 3/1972 | Koo | 340/365 P |

*Primary Examiner*—Robert E. Pulfrey
*Assistant Examiner*—R. T. Rader
*Attorney, Agent, or Firm*—Kendrick & Subkow

[57] ABSTRACT

An improved photo-electric keyboard apparatus employs key-operable shutters to intercept light paths between light sources and light-sensitive photocells to record information. Four embodiments are disclosed. In three embodiments the shutters are selectively operable to block light from their associated photocells. In the fourth embodiment the shutters are selectively operable to reflect light to their associated photocells. Information is coded by electronically sensing the "on/off" or "light/dark" condition of the photocells and/or the light sources. The keyboard apparatuses whose shutters are designed to selectively block light from their associated photocells have their light paths isolated from one another to insure that only the appropriate photocell is "activated" (e.g., blocked from light radiation) when a particular key-operable shutter is depressed.

14 Claims, 10 Drawing Figures

PHOTO-OPTICAL KEYBOARD

The present invention relates to photo-electric keyboards for business and scientific machines and equipment, such as computers, calculators, digital communications equipment, typewriters, and other machines and equipment which require human input of data.

Various types of photo-electric keyboards have been designed for computers, calculators, digital communication equipment, typewriters, and other business and scientific machines and equipment. Such photo-electric keyboards typically comprise a matrix of intersecting channels with a lamp at one end of each channel and a photocell at the other end. A key-operable shutter is provided at each intersection of channels for selectively intercepting light beams from the associated lamps. The interception of the light beams de-energizes the photocells and, through appropriate circuitry, conveys an information signal to the machine or equipment with which the keyboard is employed.

One problem associated with the photo-electric keyboard apparatuses of the type described above is that light radiation from various lamps reflects through the matrix of intersecting light paths to activate some of the associated photocells and provide an erroneous signal.

Another disadvantage of such prior keyboard apparatuses is that they may only be employed in equipment having a particular key layout, since the keys must be positioned in a pattern corresponding to the intersections of the light paths.

It is one of the objects of the present invention to provide an improved photo-electric keyboard apparatus which is more effective, more efficient, more reliable, more versatile, and less expensive than the photo-electric keyboard apparatuses which have been designed heretofore, and which avoids the foregoing and other problems and disadvantages associated with prior keyboard apparatuses.

IN THE DRAWINGS

DETAILED DESCRIPTION OF THE PREFERRED EMBODIMENTS

Figures 1, 2, 3, 4:
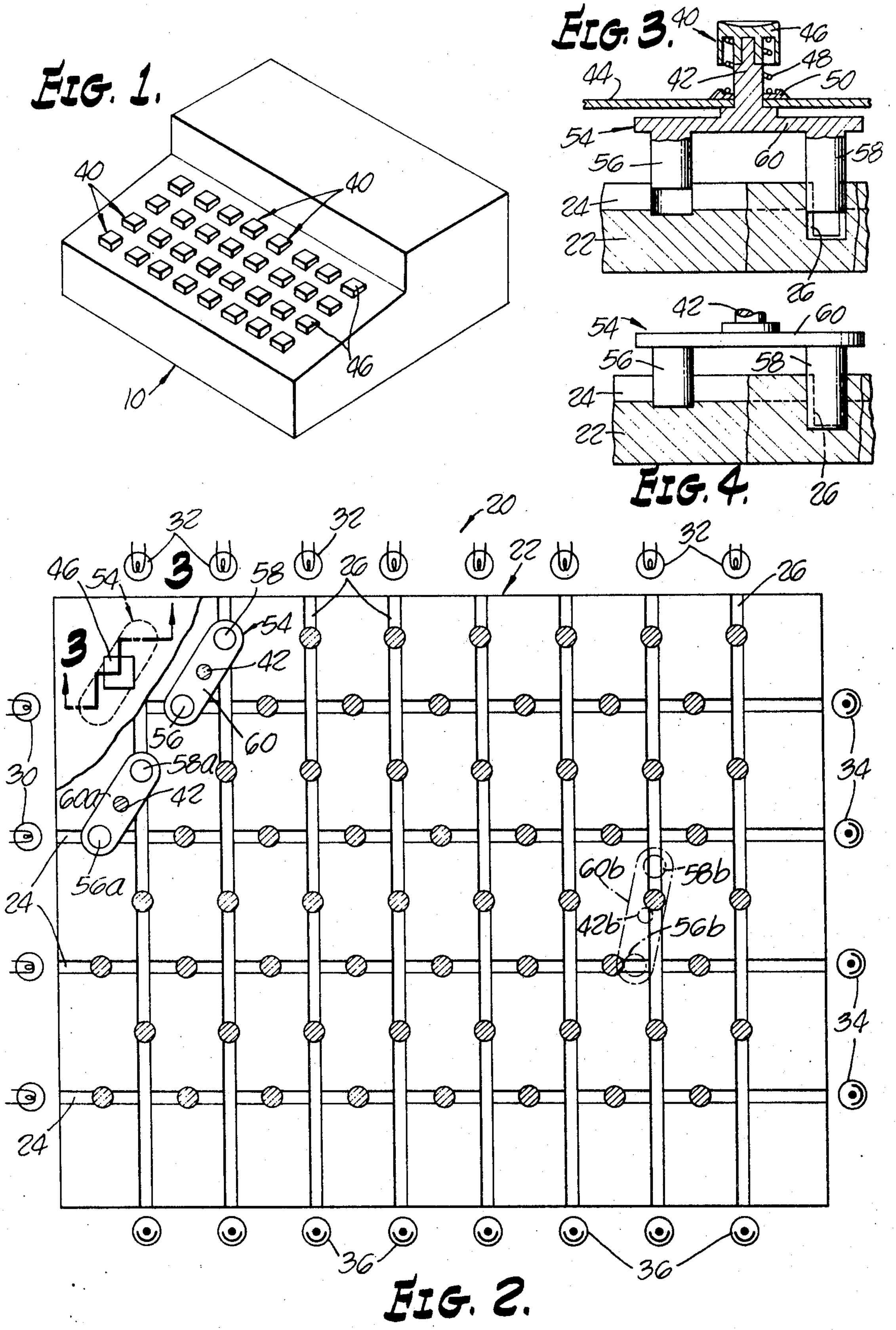
FIG. 1 is a perspective view of the exterior of a keyboard incorporating the photo-electric apparatus of the present invention.
FIG. 2 is a top plan view, partly in section, of a first preferred embodiment of the photo-electric keyboard apparatus of the present invention.
FIG. 3 is a fragmentary sectional elevation view, taken along the planes 3—3 of FIG. 2 and looking in the direction of the arrows, showing the key structure of the first preferred embodiment in its inoperative condition.
FIG. 4 is a fragmentary sectional elevation view similar to FIG. 3 but showing the key structure in its operative condition.

FIG. 1 shows the exterior of one type of keyboard which may incorporate electric keyboard apparatus constructed according to the teachings of the present invention. It is contemplated that the photo-electric keyboard apparatuses of the present invention may be used in a wide variety of business and scientific machines, such as computers, calculating machines, typewriters, and other equipment which require human input of data.

Figure 5:
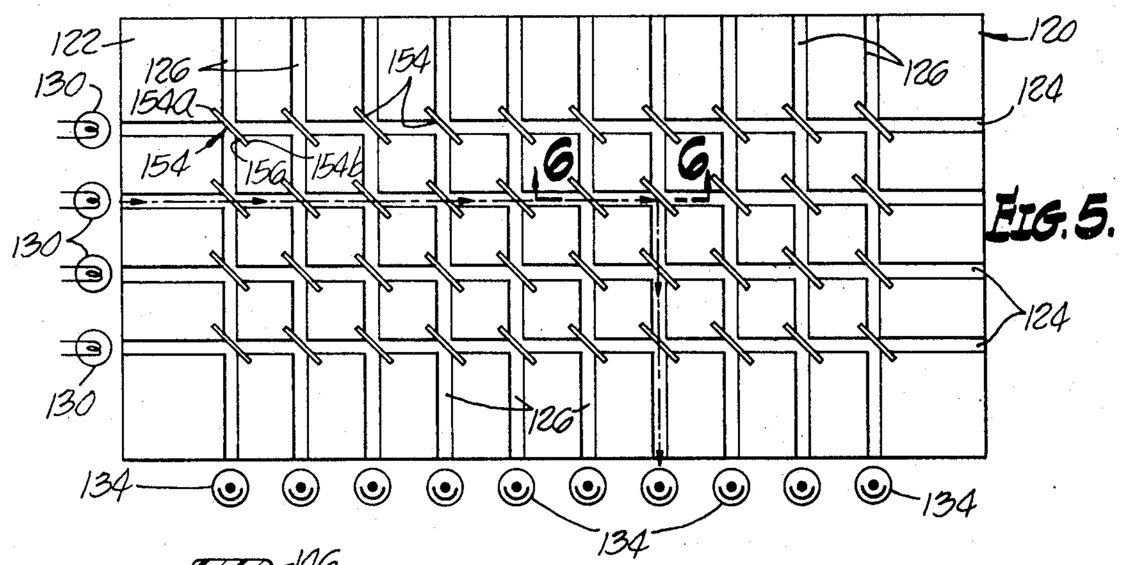
FIG. 5 is a top plan view of a second preferred embodiment of the photo-electric keyboard apparatus of the present invention.
Figure 6:
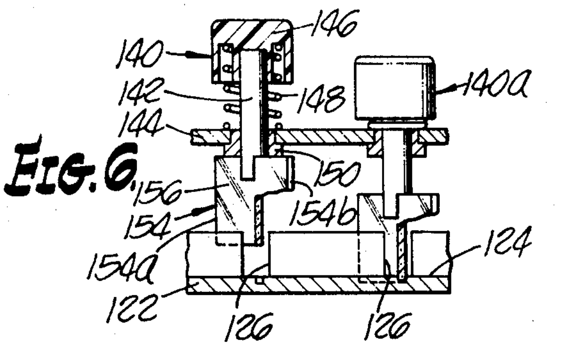
FIG. 6 is a fragmentary sectional elevation view taken along the plane 6—6 of FIG. 5 and looking in the direction of the arrows, showing the key structure of the second embodiment.
Figure 8:
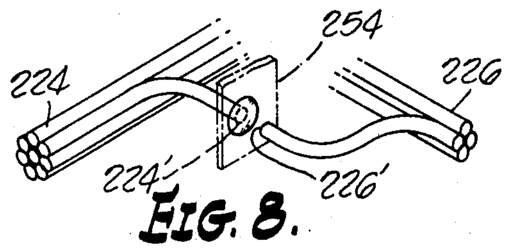
FIG. 8 is a fragmentary perspective view illustrating the manner in which a signal is produced by depressing a key of the photo-electric keyboard apparatus shown in FIG. 7.
Figure 7:
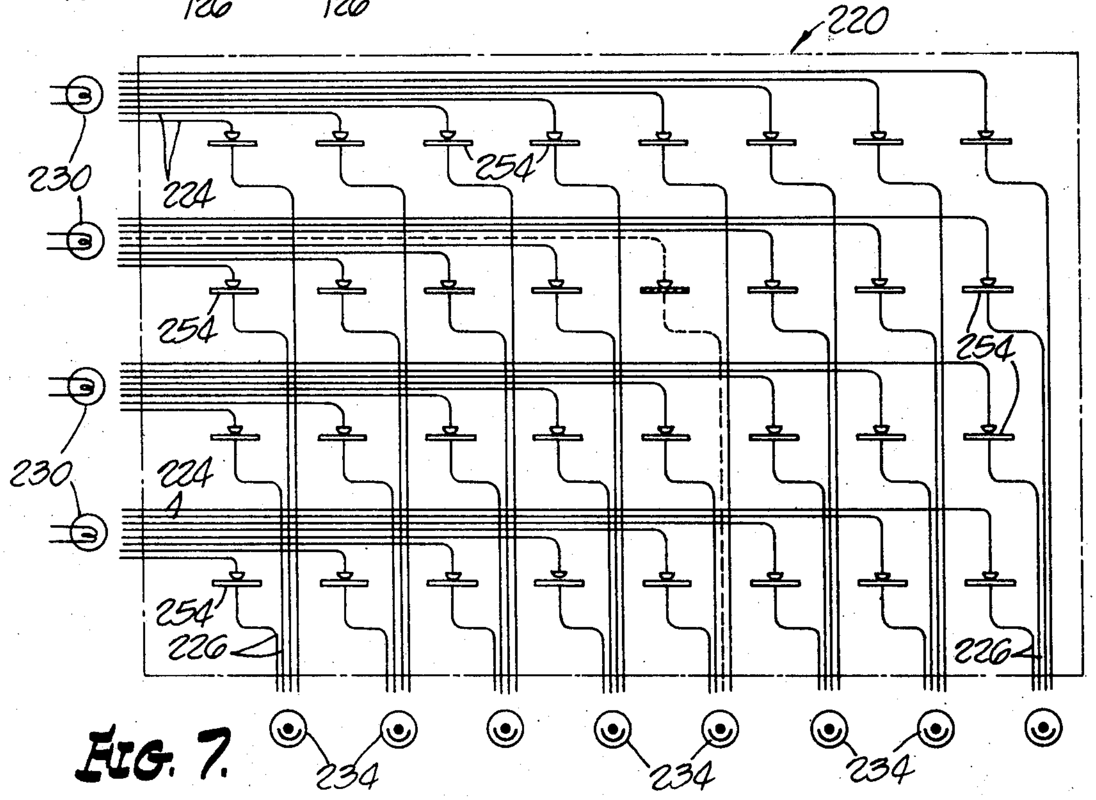
FIG. 7 is a top plan view of a third preferred embodiment of the photo-electric keyboard apparatus of the present invention.
Figure 9:
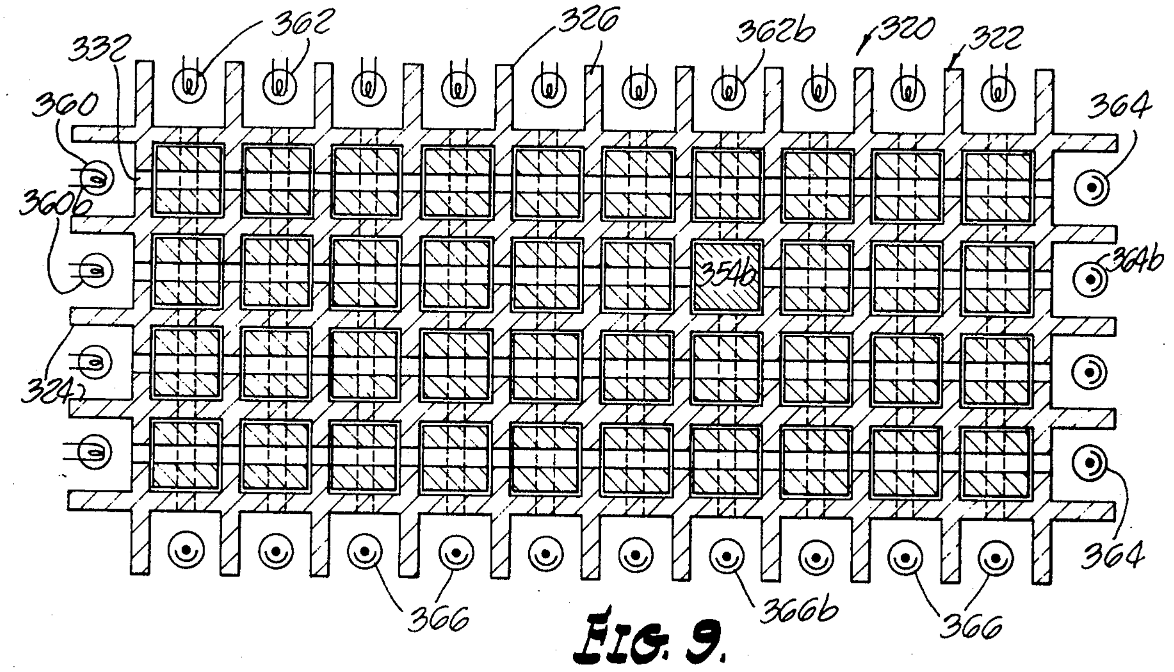
FIG. 9 is a top plan view of a fourth preferred embodiment of the photo-electric keyboard apparatus of the present invention.
Figure 10:
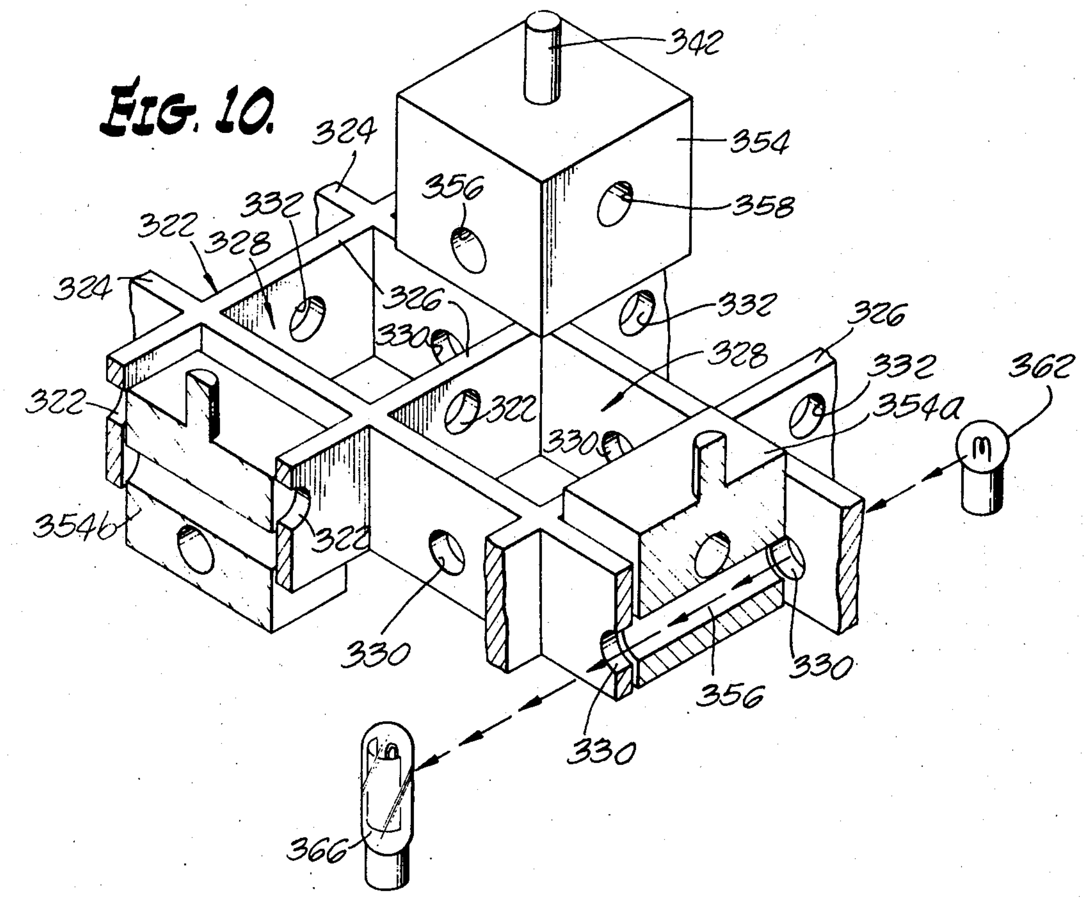
FIG. 10 is a fragmentary perspective view showing the manner in which a signal is produced by depressing a key of the photo-electric keyboard apparatus shown in FIG. 9.

Four preferred embodiments of the photo-electric keyboard apparatus of the present invention are shown in the drawings and described below. Any of these embodiments may be employed with any suitable business or scientific machine. The first preferred embodiment is illustrated in FIGS. 2–4; the second preferred embodiment is illustrated in FIGS. 5 and 6; the third preferred embodiment is illustrated in FIGS. 7 and 8; and the fourth preferred embodiment is illustrated in FIGS. 9 and 10.

DESCRIPTION OF EMBODIMENT OF FIGS. 2–4

The first preferred embodiment of the photoelectric keyboard apparatus of the present invention is the keyboard apparatus 20 illustrated in FIGS. 2–4. The keyboard apparatus 20 includes a generally rectangular block or panel 22 having a plurality of intersecting row channels 24, 24...24 and columnar channels 26, 26...26, respectively, in the upper surface thereof. As best shown in FIG. 3, the columnar channels 26 extend deeper into the block 22 than the row channels 24.

Positioned across the left and top sides of the keyboard block 22, as seen in FIG. 2, are a plurality of light sources 30, 30...30 and 32, 32...32, respectively, one light source 30 for each row channel 24 and one light source 32 for each columnar channel 26. The light sources may be any source of light radiation, such as incandescent lamps, infrared sources, lasers, etc. It is also contemplated that the light sources may comprise one or more refractors (such as a parabolic refractor, for example) which will radiate light through the channels.

A plurality of photo-electric devices comprising photocells 34, 34...34 and 36, 36...36 are positioned across the right and bottom sides, respectively, of the keyboard block 22. Each photocell 34 is positioned at the right side of a row channel 24 to receive light from the light source 30 at the left side of the channel, and each photocell 36 is positioned at the bottom of a columnar channel 26 to receive light from the light source 32 at the top of the channel.

It is comtemplated that the positions of the light sources 30, 32 and the photocells 34, 36 may be reversed or interchanged. For example, the light sources 30, 32 may be positioned across the right side and bottom of the keyboard block 22 and the photocells 34, 36 may be positioned across the left side and top; or there may be both light sources and photocells positioned along each side of the block 22, so long as there is a photocell opposite each light source.

The photo-electric keyboard apparatus 20 has a plurality of key or shutter assemblies 40, 40...40 associated therewith. As best shown in FIG. 3, each assembly 40 comprises a generally vertical connecting rod 42 slidably mounted for vertical movement in the keyboard cover plate 44. A key cap 46 is mounted on the upper end of the connecting rod 42, and a coil spring 48 is disposed around the connecting rod 42 between the bottom surface of the key cap 46 and a spring retaining plate 50 for biasing the assembly into an upper or inoperative position.

A shutter member 54 is integrally mounted on the bottom end of the connecting rod 42. The shutter member 54 includes a first light shutter 56 adapted to extend into one of the row channels 24 in the keyboard block 22 and a second, longer light shutter 58 adapted to extend into one of the columnar channels 26 in the keyboard block 22. As shown in FIG. 2, the shorter shutter 56 and the longer shutter 58 are integrally connected at their upper ends to a generally flat connecting bar 60 which is integrally mounted on the lower end of the connecting rod 42 and extends across one corner of the rectangle defined by the adjacent, intersecting row channels 24 and columnar channels 26.

The keyboard 20 of the present invention employs the principle of interception of light beams to activate associated circuitry (not shown) and thereby convey information to an associated business or scientific machine or equipment (not shown). The light sources 30, 30...30 and 32, 32...32 are energized from a suitable source of electrical energy (not shown) and the beams from the light sources pass through the row channels 24 and the columnar channels 26 to maintain their respective photocells 34, 34...34 and 36, 36...36 in an "ON" condition. In this regard, it is to be noted that the spring 48 (FIG. 3) associated with the keys 40 normally maintain the keys in a raised or inoperative position to maintain the light shutters 56 and 58 in a raised position out of their respective row channels 24 and columnar channels 26.

When one of the keys 40 is depressed, the associated light shutters 56 and 58 are pushed into their respective row channel 24 and columnar channel 26 (see FIG. 4). The presence of shutter 56 in its associated row channel 24 intercepts the light beam from the associated light source 30 to its associated photocell 34; and the presence of the longer shutter 58 in its associated columnar channel 26 intercepts the light beam from its associated light source 32 to its associated photocell 36 to thereby turn the photocell "OFF." The turning off of specific photocells 34 and 36 activates suitable circuitry (not shown; conventional, per se) to operate a suitable utilization device (e.g., a solenoid connected to a type bar) or to generate a standard digital code according to the requirements of a digital computer or other machine with which the keyboard apparatus is employed.

It will be noted that when a given key or shutter assembly 40 is depressed, the light shutters 56 and 58 block the light beams from all lamps 30 and 32 to the particular photocells 34 and 36. Since the bottoms of the row channels 24 are at a different level (i.e., higher) than the bottoms of the columnar channels 26 and the ends of the longer shutters 58 normally extend into the upper portions of their respective columnar channels 26 (see FIG. 3), it is impossible for any light beams from any of the other lamps 30 or 32 to "leak" or reflect through the matrix of row channels and columnar channels to the particular photocells 34 and 36 which must be turned "OFF" to activate the desired circuitry and send the correct signal to the utilization device (not shown). Of course the keyboard apparatus 20 will function equally effectively whether the row channels 24 are at a higher level than the columnar channels 26 (as shown in FIG. 3) or at a lower level.

The keyboard apparatus 20 of FIGS. 2–4 may be incorporated in machines or equipment having keys arranged in a wide variety of patterns or layouts since the shutters 56 and 58 associated with the keys 40 will function effectively at any position or location in their respective channels 24 and 26. For example, see the positions of shutters **56*b* and 58*b* and connecting bar 60*b* illustrated in dotted lines in FIG. 2**. This feature, which renders the keyboard apparatus useful for a virtually infinite number of key patterns, is yet another advantage of the present invention.

DESCRIPTION OF EMBODIMENT OF FIGS. 5 and 6

The second preferred embodiment of the photoelectric keyboard apparatus of the present invention is the keyboard apparatus 120 illustrated in FIGS. 5 and 6. The keyboard apparatus 120 includes a generally rectangular block or panel 122 having a plurality of intersecting row channels 124, 124...124 and columnar channels 126, 126...126, in the upper surface thereof. A plurality of light sources 130, 130...130 are positioned across the left side (as viewed in FIG. 5) of the keyboard block 122, one light source 130 for each row channel 124. The light sources 130 may be any sources of light radiation, such as incandescent lamps, infrared sources, lasers, etc., A plurality of photo-electric devices comprising photocells 134, 134...134 are positioned across the bottom side (as viewed in FIG. 7) of the keyboard block 122. Each of the photocells 134 is adapted to receive reflected light from one of the light sources 130 when an associated key-operable reflective member 154, described below, is depressed into the intersection of the row channels 124 and the columnar channel 126 where that particular photocell is positioned, as described in detail below.

It is contemplated that the positions of the light sources 130 and the photocells 134 may be reversed or interchanged. For example, the light sources 130 may be positioned across the bottom side of the block 122 and the photocells may be positioned across the left side; or there may be both light sources and photocells positioned along the left side and along the bottom side of the block 122, so long as there is a photocell positioned to receive the light beam reflected by a reflective member 154 from a light source 130. If the angular disposition of one or more of the reflective members is changed, one or more of the light sources and the associated photocells may be positioned along the top and right sides of the block 122.

The photo-electric keyboard apparatus 120 has a plurality of key or shutter assemblies 140, 140...140 associated therewith. As best shown in FIG. 6, each assembly 140 comprises a generally vertical connecting rod 142 slidably mounted for vertical movement in the keyboard cover plate 144. A key cap 146 is mounted on the upper end of the connecting rod 142, and a coil spring 148 is disposed around the connecting rod 142 between the bottom surface of the key cap 146 and the upper surface of the keyboard cover plate 144 for biasing the key into an upper or inoperative position. A bushing 150 is provided in the aperture in the cover plate 144 through which the connecting rod 142 slidably extends to facilitate sliding movement thereof.

A generally flat shutter plate 154 having at least one reflective or mirror surface 156 is mounted on the bottom end of the connecting rod 142 (see FIG. 6).

As shown in FIGS. 5 and 6, the shutter assemblies 140 are mounted in the keyboard 120 so that each reflective shutter plate 154 is disposed across the intersection of a row channel 124 and a columnar channel 126 at approximately a 45 degree angle to each channel. As shown in FIG. 5, the corners of the rectangular blocks 158 (defined by the intersecting row channels 124 and columnar channels 126) are slotted where they receive the vertical edges 154*a*, 154*b* of the associated reflective plate 154.

In operation, the springs 148 (FIG. 6) associated with the keys 140 normally maintain the reflective shutter plates 154 in a raised or inoperative position to maintain the reflective plates 154 in a raised position above their respective intersections of row channels 124 and columnar channels 126. The light sources 130, 130...130 are pulsed sequentially at a very high speed, only one light source being illuminated at a time.

With all of the key assemblies 140 in their raised or inoperative position (i.e., the position of the key assembly 140 on the left side in FIG. 6), none of the light from the associated pulsed source 130 reaches any of the sensors 134. Thus, the sensors are said to be normally "dark."

When one of the keys 140 is depressed, the reflective plate 154 is depressed into the intersection of the row channel 124 and columnar channel 126 beneath that key (see key assembly 140*a*, FIG. 6). The light beam generated by the light source 130 at the left side of that row channel 124 (as viewed in FIG. 5) impinges on the mirror surface 156 and is reflected by the mirror surface to illuminate the photocell 134 at the bottom of the corresponding columnar channel 126.

The light sensors or photocells 134 are preferably (but not necessarily) scanned during operation of the apparatus. If the photocells are scanned, they should be scanned at a more rapid rate than the rate at which the light sources 130 are scanned, so that all of the photocells 134 are scanned at least once for each period of time that any given light source 130 is illuminated.

The scanning of the light sources 130 and the illumination of the sensor 134 in the columnar channel 126 where the reflective key assembly 140 has been depressed reveals, in code form, that the particular key assembly has been depressed. Thus, each key, when depressed, generates a unique and distinct code signal which may be decoded and converted into information using appropriate electronic circuitry (not shown) which is conventional per se.

DESCRIPTION OF EMBODIMENT OF FIGS. 7 and 8

The third preferred embodiment of the photoelectric keyboard apparatus of the present invention is the keyboard apparatus 220 illustrated in FIGS. 7 and 8. The keyboard apparatus 220 utilizes sets optical fibers 224 and 226 rather than structural channels to direct light radiation from light sources 230 to light sensors 234. Optical fibers serve as good light conductors which can be bent to bend a light beam in any direction desired.

A plurality of light sources 230, 230...230 are positioned along the left side of the keyboard apparatus 220 and a plurality of photo-electric devices such as photocells 234, 234...234 are positioned along the bottom of the apparatus 220 and are adapted to receive light from the light sources 230 via the optical fibers 234 and 236. The light sources 130 may be any sources of light radiation, such as incandescent lamps, infrared sources, lasers, etc.

The optical fibers 224 and 226 have their ends harnessed in a plurality of bundles, one bundle of fibers 224 extending from each light source 230 and one bundle of fibers 226 extending from each photocell 234. A single fiber is routed from each bundle of fibers 224 and terminated beneath one of the key assemblies (not shown) of the keyboard apparatus 220 (as at 224', FIG. 8). A single fiber 226 is similarly routed from each bundle of fibers 226 and is terminated directly adjacent to the terminated end of one of the fibers 224, directly beneath a key assembly (as at 226', FIG. 8). The terminated ends 224' and 226' of fibers 224 and 226, respectively, are positioned so that light from one of the light sources 230 will be transmitted from fiber 224 to fiber 226 and to the corresponding photocell 234 at the other end of that fiber 226.

The photo-electric keyboard 220 has a plurality of key-operable shutter assemblies associated therewith. The upper portions of the key assemblies have not been shown because they are virtually identical to the upper portions of key assemblies 140 illustrated in FIG. 6. A shutter 254 in the form of a flat blade or plate is mounted on the bottom end of the connecting rod (not shown; similar to connecting rod 142 of key assembly 140 in FIG. 6) in substantially the same manner in which reflective plate 154 is mounted on the bottom of the connecting rod 142 of the key structure 140 illustrated in FIG. 6. Unlike the key assembly 140 of FIG. 6, however, the shutter plate 254 is not reflective and is not mounted at a 45° angle.

Each shutter 254 is normally spring-biased into a raised or inoperative position by means of a spring assembly (not shown; like the spring-biased key structure 140 illustrated in FIG. 6) and is adapted to be depressed into a position between the terminal ends 224' and 226' of fibers 224 and 226, respectively, to intercept and block the light beam from its corresponding light source 230 to its corresponding photocell 234.

In operation, the spring-biased key assemblies (not shown; like the keys 140 illustrated in FIG. 6) normally maintain the shutters 254 in a raised or inoperative position above the terminal ends 224', 226' of their associated fibers 224, 226. The light sources 230, 230...230 are pulsed sequentially at a very high speed, one light source 230 being illuminated at a time. At the same time the photocells 234, 234...234 are scanned by means of appropriate circuitry (not shown) which is conventional, per se. The photocells 234 are scanned at a more rapid rate than the rate at which the light sources 230 are pulsed or scanned, so that all of the photocells 234 are scanned at least one time for each period of time that any given light source is illuminated.

When one of the shutters 254 is depressed, it will extend between the terminal ends 224', 226' of the corresponding fibers 224, 226 to block or obstruct the light beam from the corresponding light source 230 (i.e., the light source at the end of the fiber 224 associated with the depressed shutter 254) to the associated photocell 234 (i.e., the photocell 234 at the end of the fiber 226 associated with the shutter 254 which has been depressed). Suitable circuitry (not shown), conventional, per se, is employed to correlate or de-code, electronically, the particular information indicated by the depressed key by determining the "dark" or blocked sensor 234 in conjunction with the corresponding light source 230 whose light beam has been blocked from that sensor. In other words, the position of the light source 230 that is "ON" together with the sensor that is "OFF" or "dark" provides the coordinates of the depressed shutter to determine a unique code which is associated only with the information to be conveyed by depressing that particular shutter.

Although the specific embodiment illustrated in FIGS. 7 and 8 and described above employs shutters to selectively interrupt light radiation between two aligned optical fibers to produce a signal, it is contemplated that the optical fibers and shutters may be designed so that normally, with the shutters raised, no light radiation will be transmitted from one fiber to another, and the shutters, when depressed, would provide conduits between their respective fibers to transmit light radiation from one fiber to another.

DESCRIPTION OF EMBODIMENT OF FIGS. 9 AND 10

The fourth preferred embodiment of the photoelectric keyboard apparatus of the present invention is the keyboard apparatus 320 illustrated in FIGS. 9 and 10. The keyboard apparatus 320 includes a honeycomb block 322 comprising a plurality of intersecting walls 324, 326 defining a network of pockets or cavities 328 therebetween. As best shown in FIG. 10, each of the row walls 324 has a plurality of apertures 330 therein and each of the columnar walls 326 has a plurality of apertures 332 therein. Each aperture 330 in each row wall 324 is aligned with apertures 330 in the other row walls and each aperture 332 in each columnar wall is aligned with apertures 332 in the other columnar walls. The apertures 330 in the row walls 324 are at a lower level than the apertures 332 in the columnar walls 326.

The photo-electric keyboard 320 has a plurality of shutter blocks 354 associated therewith. Each shutter block 354 is mounted on the bottom end of a connecting rod 342 which forms part of a spring-biased key assembly, not shown, which may be virtually identical to the spring assembly of the key assembly 40 illustrated in FIG. 3 and described in conjunction with the embodiment of FIGS. 2–4.

Each shutter block 354 has a channel 356 cut therethrough which is adapted to align with the apertures 330 in the row walls 324 of the honeycomb block 322 when the shutter is in its raised position (see shutter **354*a* in FIG. 10). Each shutter block 354 also has a second channel 358 cut therethrough at a direction substantially perpendicular to the direction of channel 356. The channel 358 is disposed at a level higher than the channel 356 so that it will align with the apertures 332 in the columnar walls 326 of the honeycomb block 322 when the shutter block 354** is in its raised position.

A spring assembly (not shown; similar to the spring assembly of the key assembly 40 shown in FIG. 3) normally maintains each shutter block 354 in its raised position (the position of block **354*a* in FIG. 10) so that the lower channel 356 therein aligns with its associated apertures 330 in the row walls 324 of the honeycomb block 322 and the higher channel 358 aligns with the apertures 332 in the columnar walls 326 of the honeycomb block 322**.

Positioned across the left side and top of the keyboard block 322 (as viewed in FIG. 9) are a plurality of light sources 360, 360...360 and 362, 362...362, respectively. The light sources 360 are adapted to beam light through channels defined by the aligned apertures 332 in the row walls 324 of honeycomb block 322 and the upper channels 358 in the shutter blocks 354; and the light sources 362 are adapted to beam light through channels defined by the aligned apertures 330 in the columnar walls 326 of the honeycomb 322 and the lower channels 356 in the shutter blocks 354. A plurality of photo-electric devices comprising photocells 364, 364...364 and 366, 366...366 are positioned across the right side and bottom (as viewed in FIG. 9), respectively, of the honeycomb block 322. The photocells 364 and 366 are illuminated by light sources 360 and 362, respectively, when the shutter blocks 354 are in their raised positions (i.e., the position of block **354*a* in FIG. 10**).

It is contemplated that the positions of the light sources 360, 362 and the photocells 364, 366 may be reversed or interchanged. For example, the light sources 360, 362 may be positioned across the right side and bottom of the keyboard blocks 322 and the photocells 364, 366 may be positioned across the left side and top; or there may be both light sources and photocells positioned along each side of the block 322, so long as there is a photocell opposite each light source.

The light sources may be any suitable source of light radiation, such as incandescent lamps, infrared sources, lasers, etc.

In operation, the shutter blocks 354 are normally maintained in a raised position by spring means (not shown) like the spring mechanism 48 for the key assembly 40 shown in FIG. 3, for example. When the shutter blocks 354 are in the raised position, the channels 356 and 358 in the shutter blocks 354 align with the apertures 330 and 332, respectively, in the honeycomb block 322 to provide light paths between the light sources 360 and 362 and the photocells 364 and 366, respectively, thereby permitting the beams from the light sources 360, 362 to energize the photocells.

When a key (not shown) associated with a shutter block 354 is depressed, the upper portion of the depressed shutter block 354 obstructs the light paths between its associated light sources 360 and 362 and the corresponding photocells 364 and 366. For example, note that the upper portion of the shutter block **354*b* shown in FIGS. 9 and 10 covers the apertures 330 and 332 in the walls of the pocket 328 in which shutter block 354*b* is disposed to interrupt the light beams from light sources 360*b* and 362 *b* and thereby turn the photocells 364*b* and 366*b* "OFF." Appropriate electronic circuitry (not shown; conventional per se) continually senses the on-off condition of the photocells 364 and 366 and generates a code signal when a pair of photocells 364b and 366b are "OFF" or "dark" at the same time. The code signal generated corresponds only to the "OFF" or "dark" condition of two particular photocells. The signal may be decoded by suitable circuitry (not shown; conventional, per se) to provide the associated business machine or equipment (not shown) with an input signal corresponding to the information indicated by the depression of the key (not shown) on which shutter block 354**b is mounted.

It will be noted that the keyboard 320 shown in FIGS. 9 and 10 will function as described above without the honeycomb block 322, since the channels 356 and 358 in shutter blocks 354, when aligned, will form a continuous path for light from a source 360 or 362 to its associated sensor 364 or 366. However, the honeycomb block 322 adds strength to the structure and facilitates sliding movement of the shutter blocks 354.

The preferred embodiments of the photo-electric keyboard apparatus of the present invention shown in the drawings and described above are, of course, exemplary only. It is contemplated that numerous changes and modifications may be made to any of the illustrated embodiments and features of the several embodiments may be combined without departing from the spirit and scope of the invention.

We claim:

1. A photo-electric keyboard apparatus comprising: a block member;

means defining a first set of substantially parallel channels in one surface of said block member; each of said channels having a bottom surface;

means defining a second set of substantially parallel channels in said one surface of said block member; each of said channels of said second set having a bottom surface; each of said channels of said second set extending at an angle to each of said channels of said first set;

a light source disposed at one end of each of said channels of said first and second sets for radiating light through the channel;

a light sensitive device disposed at the other end of each of said channels of said first and second sets for receiving light radiated through the channel from said light source at the said one end of the channel;

said channels of said first set extending deeper into said one surface of said block member than said channels of said second set;

a plurality of shutter assemblies operatively associated with said block member for selectively intercepting the light radiation in selected channels;

each of said shutter assemblies comprising first and second shutter members spaced from one another and extending substantially parallel to one another; means connecting said first and second shutter members for conjoint movement; said first shutter member being adapted to be received by one of said channels of said first set of channels; said second shutter member being adapted to be received by one of said channels of said second set of channels; each of said first and second shutter members having an outer end; said outer end of said first shutter member extending beyond the outer end of said second shutter member; spring means biasing said first and second shutter members to an inoperative position wherein said outer end of said first shutter member is spaced from the bottom surface of said one channel of the first set of channels and said outer end of said second shutter member is spaced from the bottom surface of said one channel of the second set of channels; and finger operable means for depressing said first and second shutter members simultaneously to move the outer ends of said first and second shutter members into close proximity with said bottom walls of said one channel of said first set and said one channel of said second set, respectively, to substantially block light from radiating through said respective channels.

2. A photo-electric keyboard apparatus comprising: a base member, first and second sets of light channels in said base member; said light channels extending at an angle relative to one another; a light source at one end of each of said channels; a light-sensitive device at the other end of each of said channels; a first shutter member dimensioned to be fully received by one channel of each of said first set of channels and, when fully received, to obstruct the radiation of light from said light source at said one end of said one channel to said light-sensitive device at said other end of said one channel; a second shutter member dimensioned to be fully received by one channel of each of said second set of channels and, when fully received, to obstruct the radiation of light from said light source at said one end of said channel to said light-sensitive device at said other end of said channel; said first and second shutter members being connected for conjoint movement; said first and second shutter members being movable between an extended position wherein said first and second shutter members are fully received by one channel of said first set and one channel of said set of channels, respectively, and a retracted position wherein said first and second shutter members are at least partially removed from said channels of said first and second sets, respectively; means normally biasing each of said first and second shutter members to one of said extended or retracted positions, and means for moving each of said first and second shutter members to said other of said extended or retracted positions.

3. A photo-electric keyboard apparatus according to claim 2 wherein said first set of channels comprise a plurality of substantially parallel channels in said base member, and said second set of channels comprise a plurality of substantially parallel channels in said base member.

4. A photo-electric keyboard apparatus according to claim 2, wherein said first set of channels extend substantially perpendicular to said second set of channels.

5. A photo-electric keyboard apparatus according to claim 2, wherein said first set of channels extend substantially perpendicular to said second set of channels, said first set of channels intersect said second set of channels and wherein said first set of channels extend deeper in said base member than said second set of channels.

6. A photo-electric keyboard apparatus comprising: a base member, first and second channels in said base member; said first and second channels extending substantially perpendicular to one another and intersecting one another; said first channel extending deeper in said base member than said second channel; a light source at one end of each of said channels; a light-sensitive device at the other end of each of said channels; a first shutter member dimensioned to be fully received by one channel of each of said first set of channels and, when fully received to obstruct the radiation of light from said light source at said one end of said one channel to said light-sensitive device at said other end of said one channel; a second shutter member dimensioned to be fully received by one channel of each of said second set of channels and, when fully received, to obstruct the radiation of light from said light source at said one end of said channel to said light-sensitive device at said other end of said channel; said first and second shutter members being connected for conjoint movement; said first and second shutter members being movable between an extended position wherein said first and second shutter members are fully received by one channel of said first set and one channel of said set of channels, respectively, and a retracted position wherein said first and second shutter members are at least partially removed from said channels of said first and second sets, respectively; means normally biasing each of said first and second shutter members to one of said extended or retracted positions, and means for moving each of said first and second shutter members to said other of said extended or retracted positions; said first and second shutter members comprise substantially elongated, substantially parallel members having outer ends; said outer end of said first shutter member extending beyond the outer end of said second shutter member; said outer end of said first shutter member extending partially into said first channel when said first and second shutter members are in the said retracted position; the depth which said outer end of said first shutter member extends into said first channel being greater than the depth of said second channel, whereby said outer end of said first shutter member will substantially prevent light radiation from said second channel from entering said first channel.

7. A photo-electric keyboard apparatus according to claim 6, wherein said first channel comprises one of a first set of substantially parallel channels, and wherein said second channel comprises one of a second set of substantially parallel channels; each of said first set of channels being substantially perpendicular to and intersecting each of said channels of said second set; and each of said channels of said second set being substantially perpendicular to and intersecting each of said channels of said first set.

8. A photo-electric keyboard apparatus according to claim 7, wherein said first shutter member comprises one of a first set of first shutter members, one of said set of said first shutter members being adapted to be received by each of said channels of said first set of channels; and wherein said second shutter member comprises one of a second set of second shutter members, one of said set of said second shutter members being adapted to be received by each of said channels of said second set of channels.

9. In a photo-electric keyboard apparatus comprising means defining a first set of substantially parallel light paths and a second set of substantially parallel light paths, said light paths of said first set extending at an angle with respect to the light paths of said second set, light source means at one end of each of said light paths, light-sensitive means at the other end of each said light path, and shutter means associated with each of said light paths for selectively blocking light radiation in said path; the improvement comprising means isolating each said light path from each of the other of said light paths in both said first and second sets of said light paths to prevent light radiated through any given path from illuminating any light-sensitive means other than the light-sensitive means at the other end of said given path, and further comprising a base member; said means defining said first and second sets of said light paths comprising means defining first and second sets of channels in one surface of said base member; said channels of said first set extending at an angle relative to said channels of said second set; said channels of said first set extending substantially deeper in said base member than said channels of said second set; and wherein said shutter means comprises a shutter member adapted to be received by each of said channels, and wherein said means isolating said light paths comprises an extended outer end of one of said shutter members which is adapted to be at least partially received by said deeper of said channels to block light radiation from said other of said channels from entering said deeper of said channels.

10. A photo-electric keyboard apparatus comprising a lattice structure of intersecting wall members having apertures therein; said intersecting wall members defining a matrix of openings therebetween; a shutter block member slidably disposed in each of said openings; each of said shutter block members having at least one channel extending therethrough; said apertures in said wall members and said channels in said shutter block members being adapted to be aligned to define a plurality of light paths; light source means at one end of each of said light paths and light-sensitive means at the other end of each of said light paths.

11. A photo-electric keyboard apparatus according to claim 10 wherein each of said shutter blocks is slidably mounted in its respective opening for movement to a position wherein an opaque portion of said shutter block aligns with apertures in said wall members to block light radiation from one of said light sources and thereby prevent illumination of the corresponding light-sensitive means.

12. A photo-electric keyboard apparatus comprising: first set of optical fibers and a second set of optical fibers; each of said optical fibers being adapted to conduct light; said optical fibers of each of said first and second sets being arranged in a plurality of groups at one end thereof with one end of each of said optical fibers in each group terminating adjacent to the ends of the other optical fibers in the group;

light source means adjacent to said one end of each of said groups of said first set of optical fibers;

light-sensitive means adjacent to said one end of each of said groups of said second set of optical fibers;

each of said optical fibers of said first set having its other end disposed adjacent to the other end of one of said optical fibers of said second set, whereby light radiating through said fiber of said first set will be transmitted through said fiber of said second set when the space between said adjacent other ends of said fibers is unobstructed; and shutter means operatively associated with each space between the said other ends of said fibers from said first and second sets; said shutter means being movable into said space to block light from radiating from the fiber of said first set to the fiber of said second set.

13. A photo-electric keyboard apparatus comprising: a lattice structure of intersecting walls defining a plurality of openings; a shutter block member disposed in each of said openings; apertures in said walls of said lattice structure; at least one channel extending through each said shutter block member; said channels in said block members being adapted to align with selected apertures in said walls of said lattice structure to define a plurality of light paths; each of said shutter blocks being movable between an unobstructing position wherein said channel in said shutter block aligns with selected apertures in adjacent walls of said lattice structure to provide an unobstructed light path therethrough and an obstructing position wherein a solid portion of said shutter block member aligns with said selected apertures in adjacent walls of said lattice structure.

14. A photo-electric keyboard apparatus comprising: a lattice structure of intersecting walls defining a plurality of openings arranged in rows and columns; said intersecting walls comprising a first set of substantially parallel walls and a second set of substantially parallel walls disposed substantially perpendicular to and intersecting said first set of walls; a plurality of shutter blocks disposed in said openings of said lattice structure; a plurality of apertures in each of said walls of said first set of walls in said lattice structure; a plurality of apertures in said each of said walls of said second set of walls of said lattice structure; each aperture in each of said walls of said first set being in alignment with an aperture of each of the other walls of said first set, and each aperture in each wall of said second set being in alignment with an aperture in each of the other walls of said second set; the apertures in said walls of said first set being disposed at a level above the level of apertures in said walls of said second set; first and second, spaced channels extending through each of said shutter blocks; said first and second channels extending at directions perpendicular to one another; said first channel being adapted to align with selected apertures in said walls of said first set in said lattice structure and corresponding first channels in other shutter blocks to define a light path therethrough; said second channel in each said shutter block being adapted to align with selected apertures in the walls of said second set in said lattice structure and corresponding second channels in other of said shutter blocks to define a light path therethrough; light source means positioned to radiate light through said light paths defined by said walls of said lattice structure and said channels in said shutter blocks, and light-sensitive means positioned to receive light from said light sources through said light paths; each of said shutter blocks being movable between a first position, wherein the channels therein align with corresponding apertures in said intersecting walls and corresponding channels in others of said shutter blocks to permit light from the light sources to illuminate the light-sensitive means, and a second position wherein solid poritons of said shutter blocks aligned with said apertures in said intersecting walls to obstruct the corresponding light paths and prevent illumination of the corresponding light-sensitive means.

* * * * *